(12) United States Patent
Prasad

(10) Patent No.: US 7,515,569 B2
(45) Date of Patent: Apr. 7, 2009

(54) ACCESS CONTROL FOR WIRELESS SYSTEMS

(75) Inventor: Anand R. Prasad, Munich (DE)

(73) Assignee: Agere Systems, Inc., Allentown, PA (US)

(*) Notice: Subject to any disclaimer, the term of this patent is extended or adjusted under 35 U.S.C. 154(b) by 1119 days.

(21) Appl. No.: 10/305,766

(22) Filed: Nov. 27, 2002

(65) Prior Publication Data

US 2004/0100973 A1    May 27, 2004

(51) Int. Cl.
H04W 4/00 (2009.01)
H04L 12/28 (2006.01)
H04L 9/00 (2006.01)
H04M 1/66 (2006.01)

(52) U.S. Cl. .................. 370/338; 370/401; 370/431; 455/411; 455/410; 713/165; 713/171; 713/185; 380/270

(58) Field of Classification Search .................. 370/338, 370/401, 431; 455/411, 410; 713/168, 185, 713/171, 165; 380/270
See application file for complete search history.

(56) References Cited

U.S. PATENT DOCUMENTS 6,898,711 B1* 5/2005 Bauman et al. ............. 713/185
6,970,927 B1* 11/2005 Stewart et al. .............. 709/225
6,986,046 B1* 1/2006 Tuvell et al. ................ 713/171
2002/0012433 A1* 1/2002 Haverinen et al. .......... 380/247
2003/0084287 A1* 5/2003 Wang et al. ................. 713/168
2003/0139180 A1* 7/2003 McIntosh et al. ........... 455/426
2004/0152446 A1* 8/2004 Saunders et al. ........... 455/411
2004/0203783 A1* 10/2004 Wu et al. .................... 455/436
2005/0088999 A1* 4/2005 Waylett et al. .............. 370/338
2006/0234678 A1* 10/2006 Juitt et al. ................... 455/411

* cited by examiner

Primary Examiner—George Eng
Assistant Examiner—Christopher M Brandt
(74) Attorney, Agent, or Firm—Ryan, Mason & Lewis, LLP

(57) ABSTRACT

In a wireless system comprising a server and at least one access point operatively coupled to the server, a technique for controlling access to the at least one access point comprises the steps of: (i) assigning a profile to a station adapted for communication with the system, the profile representing at least an access characteristic of the station; and (ii) associating the station to the at least one access point based at least in part on the profile assigned to the station. Access to the at least one access point by the station is thereby selectively controlled by the at least one access point. The access control methodology of the present invention advantageously can allow a system manager to selectively control the accessability of the wireless system to a user, and is configurable to provide such access control at the access point level.

28 Claims, 6 Drawing Sheets

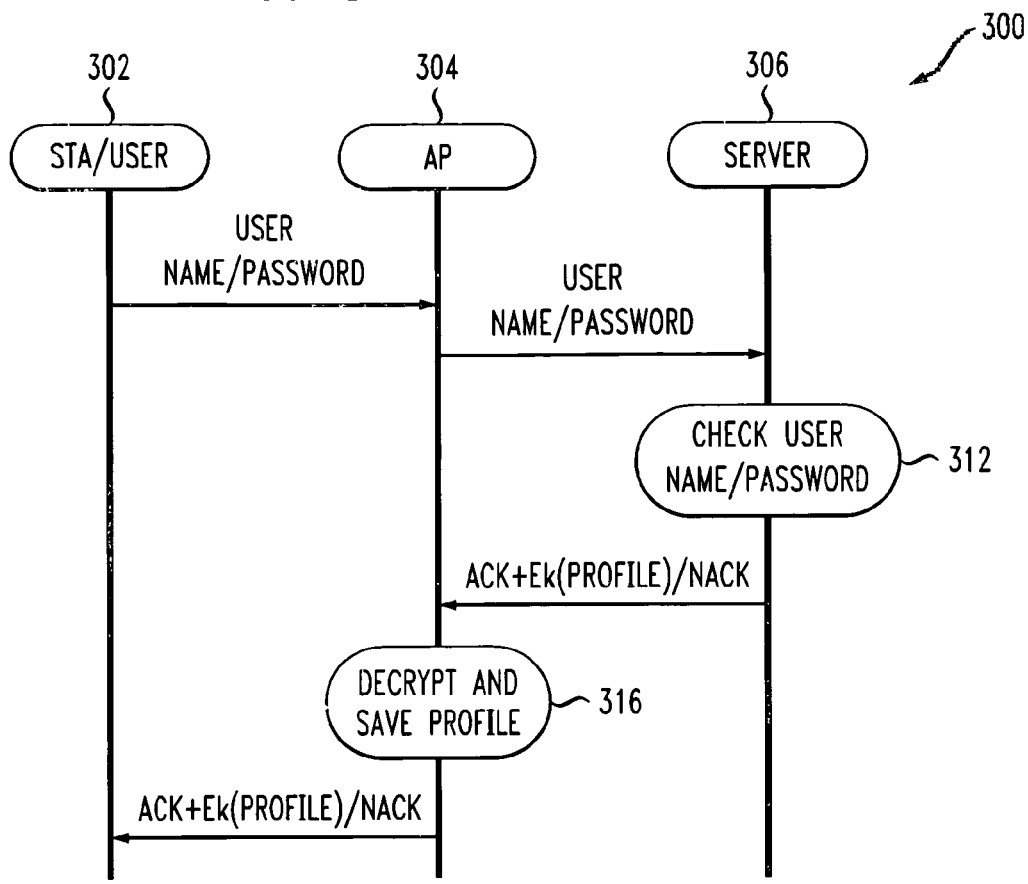
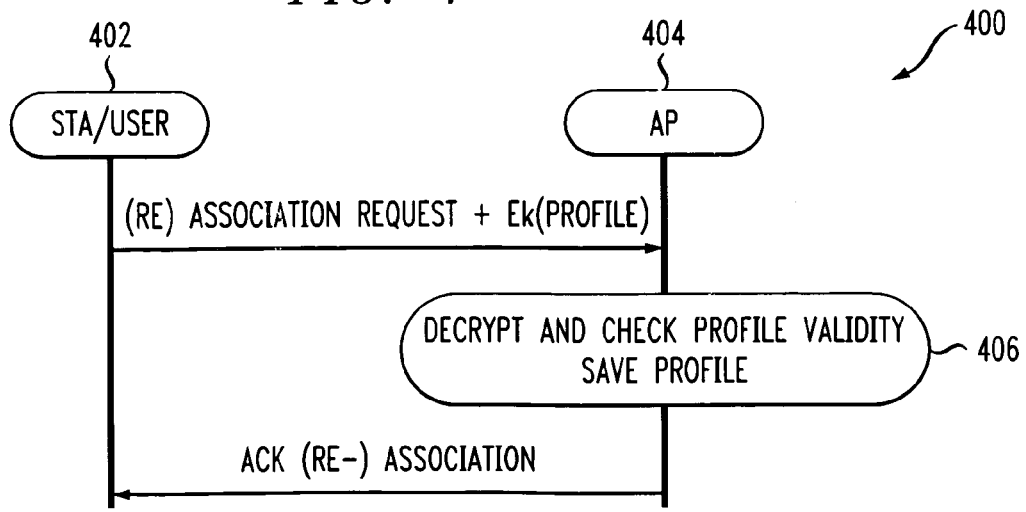

ACCESS CONTROL FOR WIRELESS SYSTEMS

FIELD OF THE INVENTION

The present invention relates generally to wireless systems, and more particularly relates to access control techniques for use in a wireless system.

BACKGROUND OF THE INVENTION

Proliferation of computers and wireless communication together has brought us to an era of wireless networking. The recent growth of wireless networks is driven, at least in part, by such benefits as ease of installation, mobility, and flexibility. These benefits can offer gains in efficiency, accuracy, and lower business costs.

The use of wireless and mobile data transfer technologies has created new issues of concern involving, for example, security-related issues such as authentication (e.g., verifying the identity of communicating client stations), confidentiality or privacy, and data integrity (e.g., insuring that data messages are not modified in transit between wireless client stations and access points). The flexibility of wireless networks has a primary drawback in that data is no longer propagated through wires, but instead is sent using radio frequency transmissions that are susceptible to eavesdropping and interference, which undesirably affects security-related issues.

The Institute of Electrical and Electronics Engineers (IEEE) 802.11 standard, and the supplements relating thereto, address medium access control over a WLAN. The IEEE 802.11 specification includes certain built-in features for providing a secure operating environment. Wireless LANs compliant with IEEE 802.11 generally attempt to combat data security problems through the use of open system cryptographic techniques for the wireless interface. The security services are provided largely by the wired equivalent privacy (WEP) protocol to protect link-level data during wireless transmission between client stations and access points. That is, WEP only provides a security mechanism for the wireless portion of the connection. The WEP cryptographic technique for confidentiality also uses an RC4 (Ron's Code #4 or Rivest) symmetric-key, stream cipher algorithm to generate a pseudo-random data sequence. The IEEE 802.11 standard is set forth in the document IEEE Std. 802.11, entitled *Supplement to IEEE Standard for Information Technology—Telecommunications and Information Exchange Between Systems—Local Metropolitan Area Networks—Specific Requirements—Part* 11: *Wireless LAN Medium Access Control (MAC) and Physical Layer (PHY) Specifications,* 1999 Edition, and in the supplements relating thereto, which are incorporated herein by reference.

Open system authentication is essentially a null authentication in which any station is authenticated by the access point. Shared key authentication typically supports authentication of stations either with or without knowledge of a shared secret key and is generally accomplished by sending clear text to the station. The station then encrypts the clear text data and sends the encrypted data back to the access point. If the station has the correct key, the access point can decrypt the message and authenticate the station.

The conventional authentication key process of transmitting both clear text data and encrypted data leaves this methodology highly vulnerable to eavesdropping, interference and/or other security-related issues. Although the IEEE 802.11 specification provides some degree of security, it does not solve the problem of access control at the wireless level.

There is a need, therefore, for improved access control techniques for use in a wireless system which address the above-mentioned security-related problems.

SUMMARY OF THE INVENTION

The present invention provides techniques for selectively controlling access to one or more access points in a wireless system, such as wireless network. An access point may include one or more nodes in the wireless system.

In accordance with one aspect of the invention, in a wireless system comprising a server and at least one access point operatively coupled to the server, a method for controlling access to the at least one access point comprises the steps of: (i) assigning a profile to a station adapted for communication with the system, the profile representing at least an access characteristic of the station; and (ii) associating the station to the at least one access point based at least in part on the profile assigned to the station. Access to the at least one access point by the station is thereby selectively controlled by the at least one access point.

The access control methodology of the present invention advantageously allows a system manager to maintain full control on the accessability of the wireless system by a user. The access control methodology provides such access control at the access point level. Access control privileges may be distinguished according to user type, or alternative criteria, by assigning a profile corresponding to each user in the system. The profile is preferably decrypted by trusted access points and the server, such that invalid access points and/or profiles will not function properly in a system employing the access control scheme.

These and other features and advantages of the present invention will become apparent from the following detailed description of illustrative embodiments thereof, which is to be read in connection with the accompanying drawings.

BRIEF DESCRIPTION OF THE DRAWINGS

FIG. 3 is a graphical flow diagram depicting an illustrative user login methodology, in accordance with the present invention.

FIG. 4 is a graphical flow diagram depicting an illustrative successful station/access point association, in accordance with the present invention.

DETAILED DESCRIPTION OF THE PREFERRED EMBODIMENTS

The present invention will be described herein in the context of an exemplary wireless local area network (WLAN). It should be appreciated, however, that the present invention is not limited to this or any particular WLAN configuration and/or application. Rather, the invention is more generally applicable to techniques for selectively controlling access to one or more access points, which may include one or more nodes, in a wireless system. Also, although particularly well-suited for use in conjunction with the IEEE 802.11 standard, the invention can be used with other standards, as well as in non-standard systems.

Figure 1:
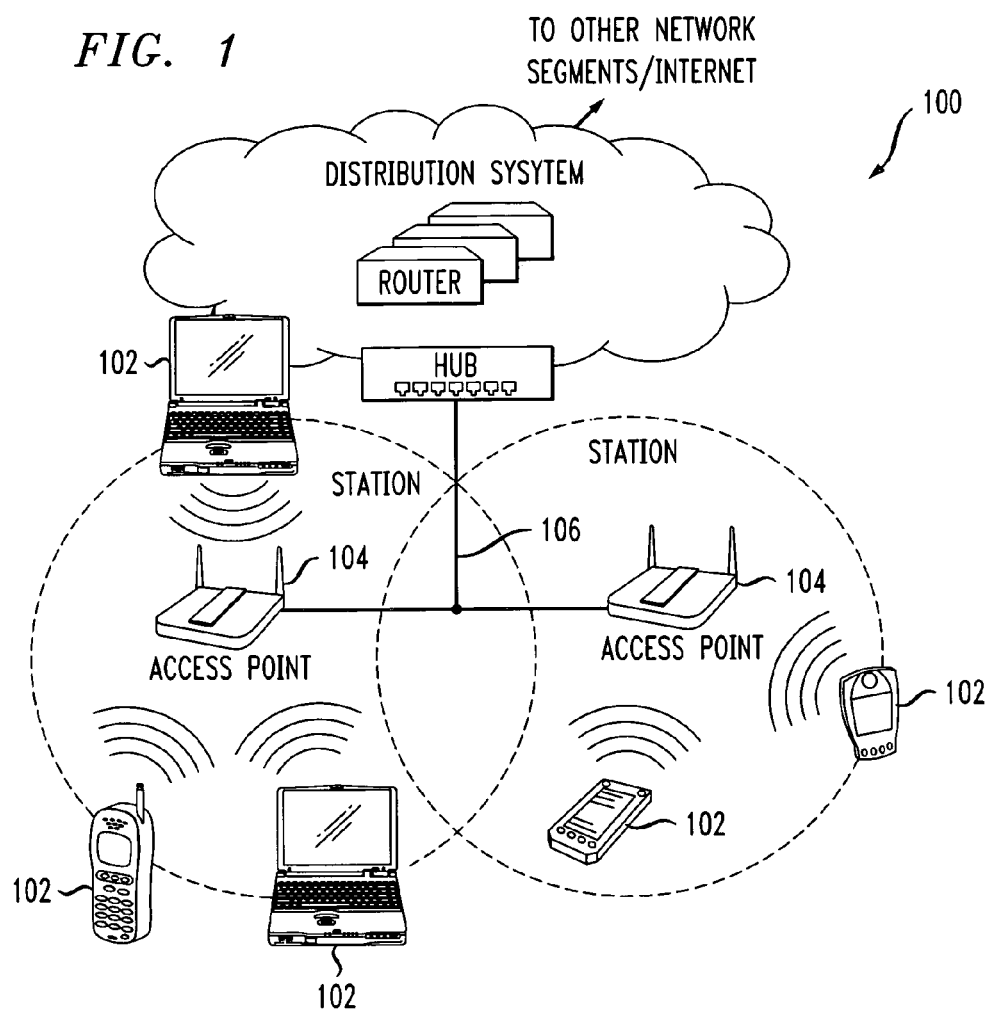
FIG. 1 is a graphical illustration depicting a wireless system in which the present invention may be implemented.

FIG. 1 depicts an illustrative wireless system 100, which may include a WLAN, in which the present invention may be implemented. Wireless system 100 may include a plurality of stations 102, which typically comprise computers, telephones, personal data assistants (PDAs), or other devices equipped with a wireless network interface card (NIC). The wireless system 100 further includes a plurality of access points (AP) 104, which typically serve as wireless bridges or interfaces between a wireless network and a wired network 106 (e.g., Ethernet LAN). Access points, which may include one or more nodes in the system, are coupled to the wired network 106 and generally receive and transmit signals between the stations 102 and the network 106. Any device in the range of a given access point can send and receive information from this point.

Figure 2:
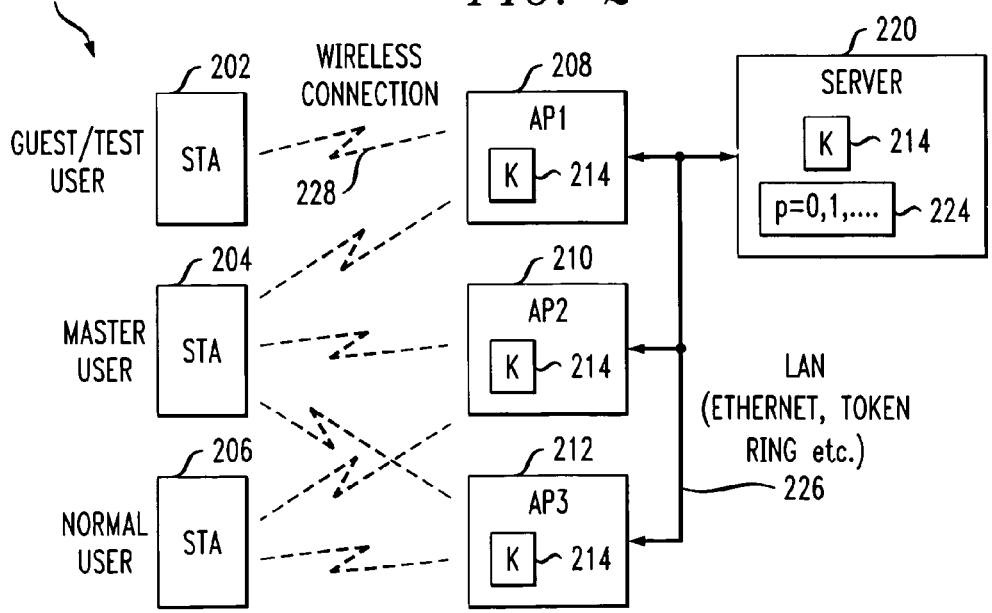
FIG. 2 is a block diagram of an exemplary wireless system, formed in accordance with one aspect of the present invention.

FIG. 2 illustrates an exemplary WLAN 200, formed in accordance with the present invention, which may be implemented in the wireless system of FIG. 1. The WLAN 200 preferably includes a plurality of stations (STAs) 202, 204 and 206, which, as previously stated, may comprise computers, telephones, PDAs, or other devices equipped with a wireless NIC. Users may communicate with the network through one or more of the stations. Each of the stations 202, 204, 206 in the exemplary WLAN 200 are configurable to communicate with one or more access points (APs) 208, 210 and 212 by way of a wireless channel 228, such as, but not limited to, radio frequency (RF) or infrared (IR), established between a station and an access point. A station may communicate with more than one access point. The access points 208, 210, 212 are preferably connected to a server 220 through a wireline network or local area network (LAN) 226, such as, for example, ethernet, token ring, etc, although alternative connection arrangements are similarly contemplated. The term "server" as used herein is intended to include a single server arrangement or a plurality of servers connected, for example, in a distributed arrangement, as will be understood by those skilled in the art.

The methodologies of the invention, as will be described herein, preferably allow a valid user or users to access one or more access points, and thereby access files (depending on the user and organization) in the server 220. Moreover, the methodologies of the invention preferably provide a network administrator full access to the access points, including the authorization to load new firmware, while providing certain users (e.g., guest users, test users, etc.) selective access (e.g., controlled roaming, limited access to services/servers) to the access points. The techniques of the present invention may be used with any existing security schemes for WLANs or other wireless systems.

In accordance with one aspect of the invention, an access control methodology preferably utilizes a plurality of different profiles 224 (e.g., p=0, 1, . . . ), which may be stored in server 220. Alternatively, such profiles 224 may be stored externally to the server, such as in a database (not shown) that is selectively uploadable by the server. Each profile corresponds to a particular user type, such as, for example, guest user, test user, master user, normal user, etc. Each profile type preferably includes certain access characteristics associated therewith. These access characteristics may affect, among other things, which access points in the network the corresponding user can access and the extent of such access (e.g., read only access, read/write access, etc.). The profiles may be encrypted by a shared key (K) 214 included in each of the access points 208, 210, 212 and in the server 220. The shared key 214 is preferably the same throughout the network. Essentially any encryption algorithm may be used to encrypt the profiles.

An exemplary access control methodology, in accordance with the present invention, will now be described. First, all users are preferably assigned a particular profile (e.g., 0=default profile with no access rights; 1=normal user profile; 2=test profile; 3=master profile; 4=guest profile; etc.). As previously stated, each profile will be related to a certain group of one or more access points and services and/or servers (e.g., network accessibility) which the user may access. By way of example only, assume a normal user station 206 has access to all access points, but cannot perform tests or otherwise make changes in the access points; a master user station 204 has access to all access points 208, 210, 212 and may modify the access points, such as by uploading new software, etc.; and a guest/test user station 202 has full access to all access points 208 in a guest/test group, but may operate as a normal user when accessing other access points outside of the guest/test group. As used herein, the guest/test user station 202 may be a guest user station, a test user station, or both. In the server 220, the profile of a given user may relate to a unique identifier associated with the user, such as, for example, the user's password, login name, or other identification used by the server to recognize the user.

Once a particular profile is assigned to a user, the profile information is obtained and related access points are informed of the user's profile. This may be accomplished, for example, by encrypting the profile by a shared key known to all access points in the given network and to the server storing the profile. A network manager can preferably change the shared key in all access points in a single procedure by using, for example, a network management tool, as will be understood by those skilled in the art. The frequency with which the key should be changed may depend upon the level of security desired in the network. For instance, stricter security measures may require that the shared key be changed more frequently.

With reference now to FIG. 3, there is shown an illustrative methodology 300 for obtaining profile information corresponding to a given station/user 302 and informing a related access point 304 of the user's profile. As used herein, a station/user may be defined as a station and/or an associated user communicating through the station. When a user logs in to a server 306 through a particular access point 304, the server checks the user name and password at step 312 to verify that the user is a valid user (i.e., authentication). The user may log in to the server 306 using any protocol, such as, but not limited to, RADIUS (remote authentication dial-in user service), Kerberos, etc. When the server authenticates the user, an acknowledgment (ACK) message along with an encrypted profile (Ek) are preferably sent to the access point 304 through which the user is logging in. The access point 304 preferably decrypts and saves the profile at step 316 and sends the encrypted profile and acknowledgment to the station 302 through which the user is logging in. When the server 306 cannot authenticate the user, the server preferably sends a negative acknowledgment (NACK) message to the access point 304 and station 302 through which the user is logging in.

Preferably, the encrypted profile is stored in the station 302 only when the station is switched on, and is removed when the station is switched off or when the user logs out. When the user logs out, the station may remove the profile. Alternatively, the server 306 may send a default profile to the station 302 which is common to all users and provides no access privileges. Similarly, the access point 304 can either remove the profile and/or station from a list of related profiles and/or stations, or copy the default profile for that particular station 302.

In FIG. 4, an exemplary methodology 400 is depicted for associating and/or re-associating a station 402 with a given access point 404. As apparent from the figure, when a station 402 associates and/or re-associates with an access point 404, the station sends the encrypted profile (Ek) to the access point along with an association or re-association request. After receiving the request, the access point 404 preferably decrypts the profile at step 406. Once the profile is decrypted, the access point 404 knows the extent of access to be given to a user logged in through the particular station 402. The access point 404 also knows the other access points in the network to which the user is allowed to access.

Figure 5:
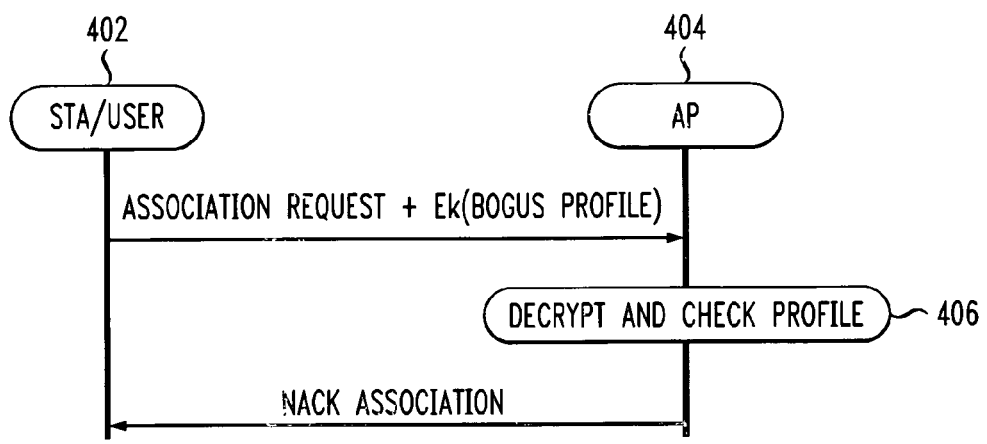
FIG. 5 is a graphical flow diagram depicting an illustrative unsuccessful station/access point association attempt, in accordance with the present invention.

The access point 404 preferably verifies the validity of the profile at step 406. When the profile is determined to be valid, the access point 404 saves the profile at step 406 and returns an acknowledgment (ACK) message to the station 402, thereby indicating a successful association and/or re-association. As illustrated in FIG. 5, when the access point 404 detects an invalid or absent profile (which may be referred to as a "bogus profile") at step 406, the access point 404 will not be associated and/or re-associated with the particular station 402, and the access point will return a negative acknowledgment (NACK) message to the station originating the association request.

An association and/or re-association request should always be accompanied by an encrypted profile. When a new user logs in to the network through a station being concurrently used by another user (i.e., the other user is still logged in), the profile of the previous user can be removed or both of the profiles may be kept. In this scenario, a priority level may be assigned to each of the concurrent users so as to eliminate potential conflicts. In a present access point, the profile having the highest priority will be kept. Alternatively, depending upon the organization, the access point may be configured such that the profile having the least priority is kept. When one of the users logs out, the profile corresponding to that user may be removed from the station if two or more profiles are being maintained. When such station moves to a different access point in the network, the profile having the highest priority (or least priority, depending on how the access point is configured) will be sent during the association procedure.

In an illustrative embodiment of the invention, only one user is logged in through a station at a particular moment, and thus only one profile is maintained in the station. This scenario simplifies the design of the station and access points and reduces the amount of information that must be maintained by the station and access points. Alternatively, one or more of the access points may support multiple users logged in through a particular station concurrently. In this manner, the access points may be configured to store additional information, such as, for example, station media access control (MAC) addresses, as well as the names and profile, associated with each user.

In general, profiles will preferably be modified when the password associated therewith expires. However, for security purposes, a network manager may want to modify the profiles more often. Accordingly, the access control protocol may be configured such that the profiles include a parameter (e.g., an aging parameter) for indicating an expiration of the profile. By limiting the amount of time a particular profile remains valid, the wireless network can advantageously be made more secure. Since the expiration parameter relates to timing, a profile expiration methodology may be performed in the following manner, in accordance with an illustrative aspect of the present invention.

First, a timeout period is established for the profiles. This can be done, for example, on an individual basis, whereby different timeout periods are set for each profile, globally, whereby all of the profiles are assigned the same timeout period, or in other ways, such as a hybrid of individual and global timeout periods. Alternatively, certain groups of profiles may be set to have the same timeout period (e.g., normal users, guest users, etc.). The timeout period, or timeout periods when multiple periods are employed, may be maintained at both the access points and the stations. Next, an encrypted timestamp/timeout period pair and an unencrypted timestamp/timeout period pair are included in the profile. When a profile timeout occurs, the station may initiate a request for a new profile. The unencrypted timestamp and timeout period pair may be used by the station for determining when to request a new profile. The encrypted timestamp and timeout period pair may be used by the access point to validate a new profile request from the associated station.

Upon receiving a request for a new profile from a particular station, the access point preferably checks the timeout of the profile for that station/user. When the request for a new profile from the station is determined to be valid, the access point will forward the new profile request to the server, which then sends the new profile to the access point and associated station. When the access point determines that the request from the station is invalid, an indication (e.g., error message, alarm, etc.) may be sent to the server, together with the available station and user information.

The WLAN of the present invention may be configured such that profiles can be changed at times other than during the profile expiration process previously described. For example, a network manager may want to immediately revoke (or provide) access privileges to one or more users logged into the WLAN. This type of profile change may be referred herein as a "sudden profile change." When a sudden profile change occurs, the access points and associated stations are preferably notified of this change. A sudden profile change may be accomplished in the following illustrative manner, in accordance with the invention. First, the server sends a new profile, which may be encrypted, and broadcasts a profile change relating to one or more stations to one or more access points. Next, the access point associated to the station reads the profile and then sends the new profile to the station. Upon receiving the profile from the access point, the associated station changes its profile.

Users maybe confined to certain areas or groups, depending on their respective profiles. By way of example only, guests may be allowed to access the WLAN only from a showroom, or test engineers allowed to access the WLAN for test purposes only in designated areas. Moreover, users may be allowed to move or otherwise roam from one access point to another access point in the network without the need for logging in to the server (e.g., supplying user name and password) each instance. This selective access control may be referred to herein as "controlled roaming."

An illustrative methodology for controlled roaming may be performed in the following manner, in accordance with the invention. First, each profile may include a MAC address field and be assigned one or more MAC addresses corresponding to access points with which the profile is allowed to communicate. For certain profile types (e.g., master and normal users) that provide access to all access points in the network, this MAC address field may not be utilized, or may be set to some null value. Next, when a station associates or re-associates, or otherwise sends its profile to an access point, the access point determines whether the station is listed in the MAC address list of the profile. For those profiles which do not use the MAC address field, this step may be omitted.

Figure 6:
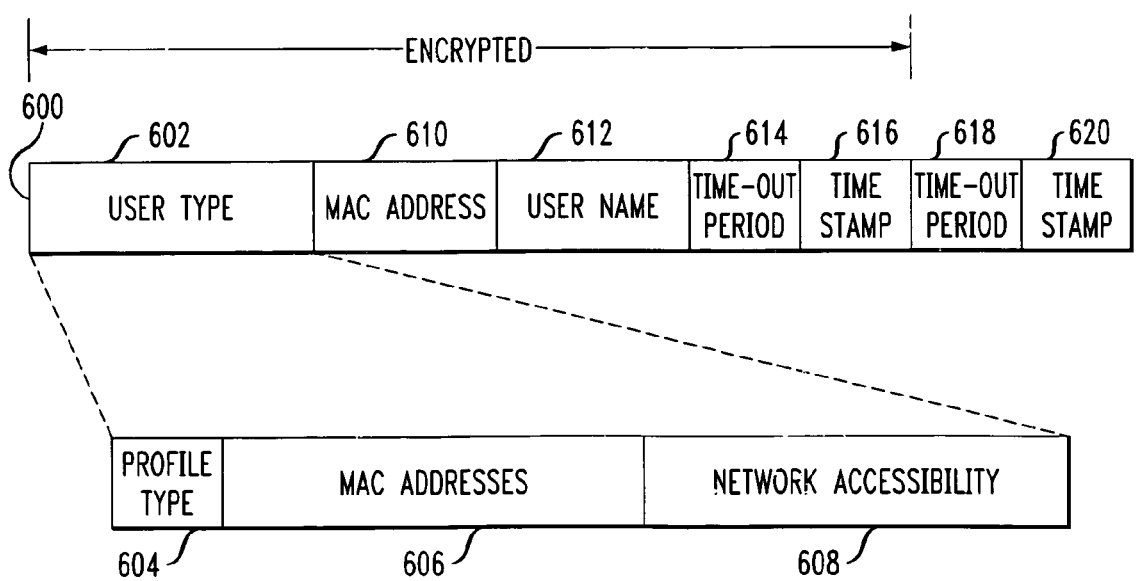
FIG. 6 illustrates an exemplary profile format, in accordance with the present invention.

FIG. 6 illustrates an exemplary profile format, in accordance with one aspect of the invention. As apparent from the figure, a profile 600 may include a plurality of fields, such as, for example, a user type field 602, a MAC address field 610, a user name field 612, a first timeout period field 614, a first timestamp field 616, a second timeout period field 618 and a second timestamp field 620. The position of each field in profile 600 is arbitrary. The first timeout period/timestamp field pair is preferably encrypted, while the second timeout period/timestamp field pair is unencrypted. One or more of the fields in profile 600 may further comprise additional fields. For instance, the user type field 602 may further include a profile type field 604, a MAC addresses field 606 and a network accessibility field 608. It is to be understood that the format fields are merely illustrative, and that additional or different fields may be included in a given profile. Moreover, not all fields shown herein may be used by every access point in the network. Alternative profile formats are similarly contemplated by the invention.

As previously stated, the illustrative parameter definitions in Table 1 below maybe employed for the profile fields in profile 600.

TABLE 1

| Profile Field | Parameter Description |
| --- | --- |
| User type: Profile type | Indicates the type of user associated with the profile. The number of different profile types is a flexible parameter and is not limited. Possible type include, for example, guest user, test user, manager, normal user, etc. |
| User type: MAC addresses | Indicates the MAC addresses of access points which a station and/or associated user is allowed to access. |
| User type: Network accessibility | Indicates the areas of a network that a corresponding user is allowed to access. This is a flexible parameter which can be defined in various ways, including services to which a user is allowed to access, servers to which a user is allowed to access, etc. |
| MAC address | Indicates the MAC address of the station associated with the profile. |
| User name | Indicates the login name of the user |
| Unencrypted timeout period | Relates to profile expiration and indicates the time period during which the profile is valid or, in other words, the time period after which a new profile should be requested from the server. |
| Unencrypted timestamp | Relates to profile expiration and indicates when the profile was created. This parameter may be used as a starting point of the timeout period. Together with the unencrypted timeout period parameter, the timestamp/timeout parameters may be used to determine the lifetime of the profile and request a new profile. |
| Encrypted timeout period and timestamp | These parameters together may be used by the access point to verify whether the station is requesting a profile during a valid time interval. Since it is encrypted, the access point knows whether or not the profile has been modified by the station. |

Figure 7A:
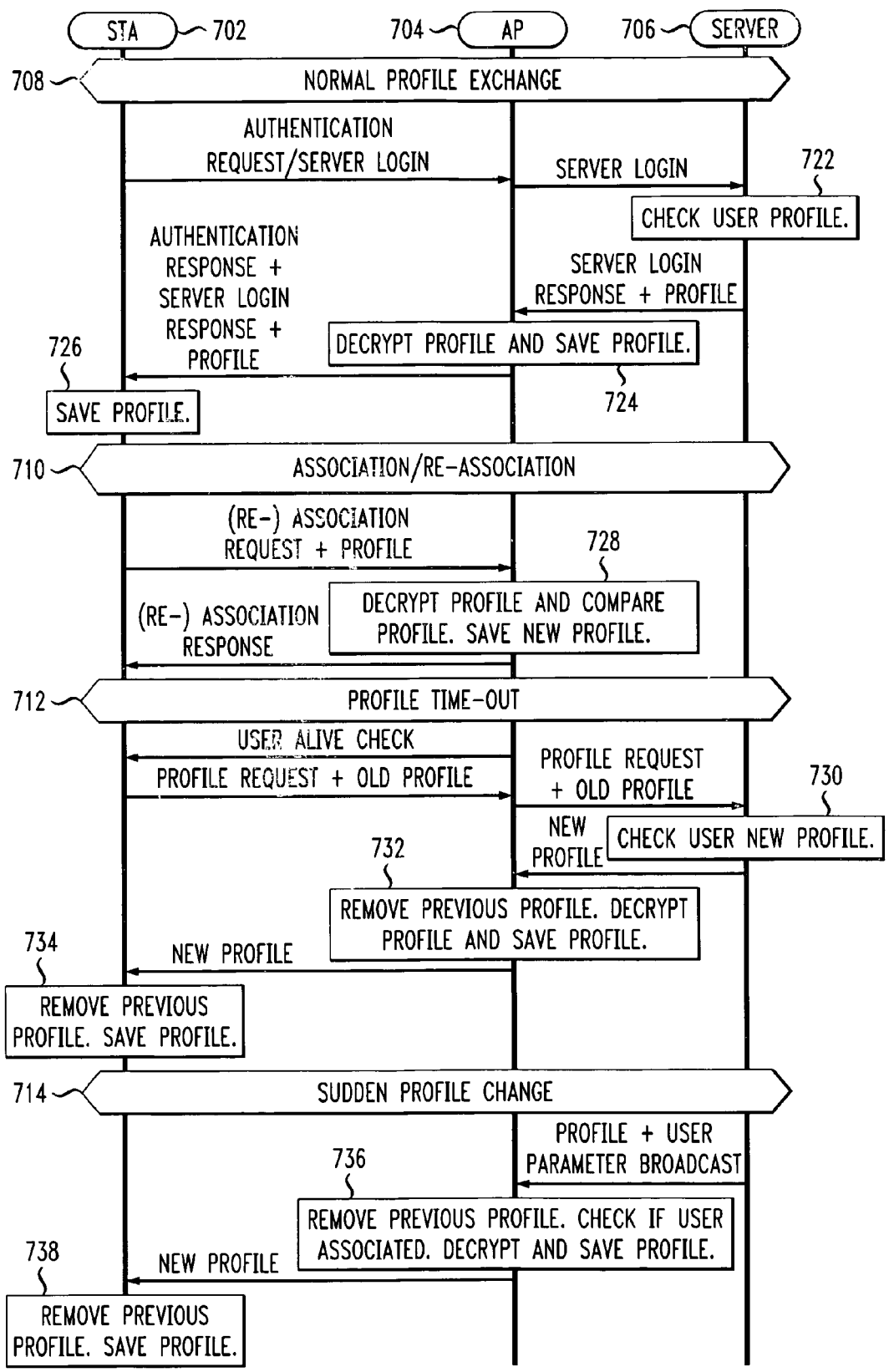
FIGS. 7A and 7B are graphical flow diagrams illustrating an exemplary access control methodology, in accordance with the invention.
Figure 7B:
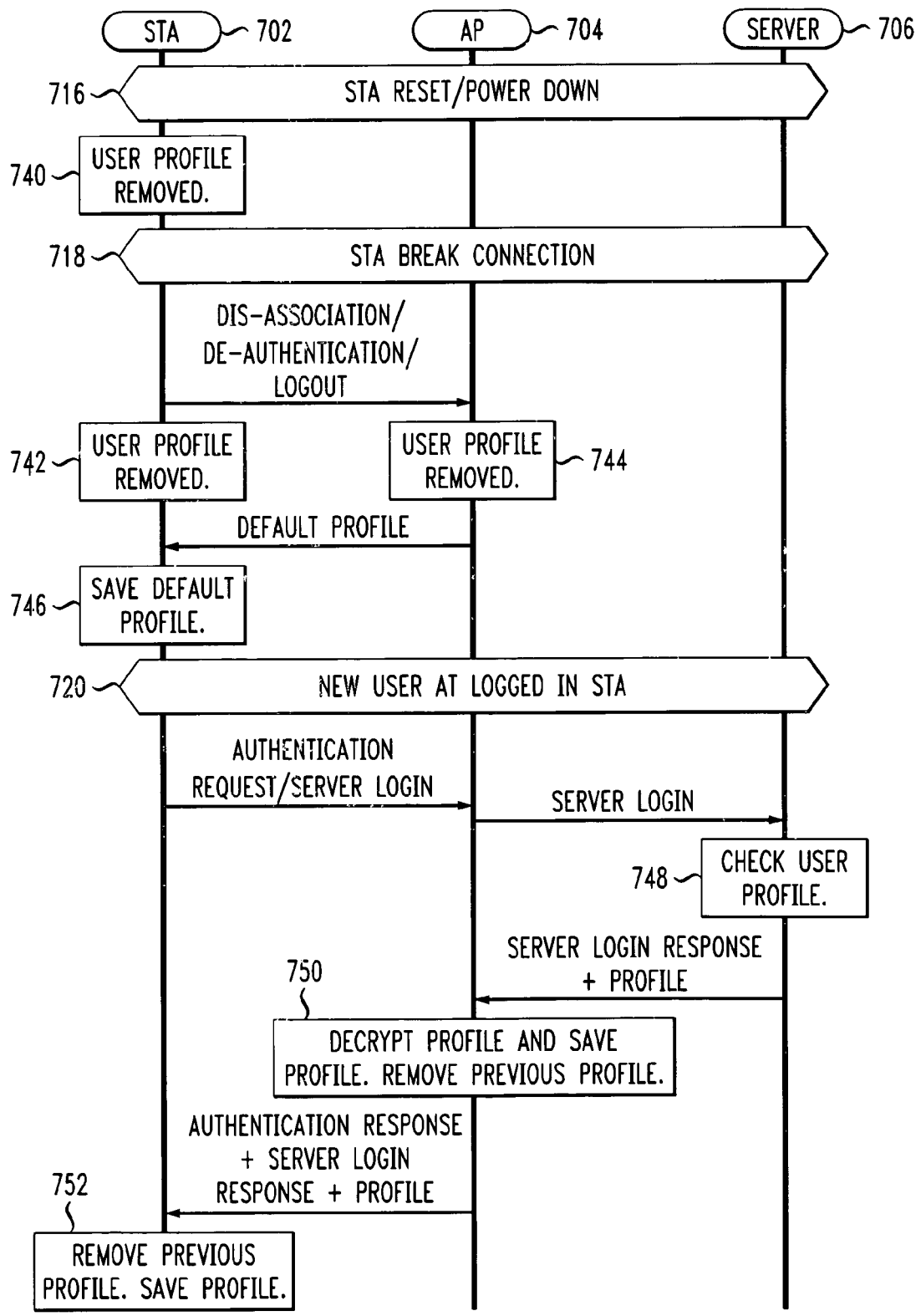

By way of example only, FIGS. 7A and 7B depict several illustrative access control methodologies between a given station/user (STA) 702, access point (AP) 704, and server 706, in accordance with one aspect of the present invention. As previously stated, the term station/user as used herein refers to a station and/or a user associated with the station. Such exemplary access control methodologies include, for example, normal profile exchange 708, association and/or re-association 710, profile timeout 712, sudden profile change 714, station reset and/or power down 716, station break connection 718, and new user login 720 procedures.

With reference to FIG. 7A, an exemplary normal profile exchange procedure 708 includes a login step, wherein a user/station 702 sends identification information (e.g., user name and password) in the form of an authentication request to the server 706 through the access point 704. The server 706 checks the user profile at step 722 and sends a server login response (e.g., acknowledgment) and profile, which may be encrypted, to the access point 704. The access point then decrypts and saves the profile at step 724. Subsequently, the access point 704 sends an authentication response, the server response and the profile, which may be encrypted, to the station 702 initiating the authentication request. The station 702 saves the profile at step 726. A profile exchange procedure was also described above in conjunction with FIG. 3.

When the user sending the authentication/login request cannot be authenticated by the server at step 722, the server may send a negative acknowledgment (NACK) message to the access point 704 as its server login response. A profile may not be sent by the server in this instance. The access point, upon receipt of a negative acknowledgment from the server, may omit step 724 and simply pass the negative acknowledgment as the server login response to the station 702, without sending a profile. In this instance, the station may omit step 726. In response to the negative acknowledgment, the station 702 may initiate another action, such as, for example, re-sending the authentication request/server login, thereby starting the normal profile exchange procedure 708 again.

An exemplary association and/or re-association procedure 710 for associating or re-associating a station 702 with an access point 704 includes sending an association request and profile, which may be encrypted, from the station 702 to an access point 704. The access point 702, upon receiving the association request, decrypts and compares the profile at step 728 in order to verify the validity of the received profile. When a valid profile is determined to be valid, the access point 704 saves the new profile at step 728 and sends an association/re-association response (e.g., acknowledgment) to the station 702 originating the association request. A procedure for associating and/or re-associating a station with an access point was also previously described in connection with FIG. 4.

An illustrative profile timeout procedure 712 may include the step of sending a "user alive check" from access point 704 to an associated station 702 to check the status of the user/station, e.g., to determine whether or not the timeout period of the profile has expired. When the profile timeout period has expired, or the user/station otherwise requests a new profile, the station 702 sends a new profile request along with the old profile, which maybe encrypted, to the network server 706 through the associated access point 704. At step 730, the server 706 checks the new profile and sends the new profile, which may be encrypted, to the access point 704. The access point 704, at step 732, removes (e.g., deletes) the previous profile, decrypts the new profile (if encrypted), and saves the new profile. The access point 704 then sends the new profile, which may be encrypted, to the associated station 702. At step 734, the station 702 removes the previous profile and saves the new profile.

As previously stated, a network manager may choose to change the profile of one or more users/stations at a particular time other than after the expiration of a profile timeout period. Accordingly, the access control methodologies of the present invention preferably support a sudden profile change. In an illustrative sudden profile change procedure 714, the server 706 sends a new profile, which may be encrypted, and broadcasts a user parameter (e.g., profile change) relating to a given station 702 to the access point 704. Next, the access point 704, upon receiving the new profile from the server 706, removes the previous profile and checks to determine whether the user/station 702 is associated with the access point 704 at step 736. If the station 702 is still associated with the access point 704, the access point decrypts and saves the new profile at step 736. The new profile, which may be encrypted, is then sent to the associated station 702. Upon receiving the new profile from access point 704, station 702 removes the previous profile and saves the new profile at step 738.

With reference now to FIG. 7B, during a station reset/power down procedure 716, the profile stored in the station 702 is removed (e.g., deleted). Similarly, during a station break connection procedure 718, the station 702 removes the profile at step 742 and sends a logout or disassociation/de-authentication request to the associated access point 704. Upon receiving the logout request from the station, the access point removes the profile at step 744. The access point 704 then sends a default profile to the station 702. The station 702 saves the default profile at step 746. A default profile, as previously explained, may be defined such that the corresponding station is denied access privileges to any of the access points in the network, thereby ensuring network security.

When a new user desires to log in at a station already logged in to the network, the following exemplary new user login procedure 720 may be employed. First, the station 702 sends an authentication request/server login message to the server 706 through an access point 704. At step 748, the server 706 verifies the validity of the new user. When the new user is determined to be a valid user, the server sends a login response, such as, for example, an acknowledgment (ACK) message, along with the profile, which is preferably encrypted, to the access point 704. Upon receiving the new user profile, the access point 704 decrypts and saves the new profile at step 750. The access point then removes the previously stored profile at step 750. The access point 704 subsequently sends an authentication response, the server login response (e.g., ACK) and new profile, which is preferably encrypted, to the station 702. Upon receiving the new profile, the station removes the previous profile and saves the new profile at step 752.

When the server 706 cannot authenticate the user at step 748, the server may send a negative acknowledgment (NACK) message as its server login response to the access point 704. In this instance, the access point may omit step 750 and simply pass the negative acknowledgment from the server 706 to the station 702. In this instance, the station may omit step 752.

Figure 8:
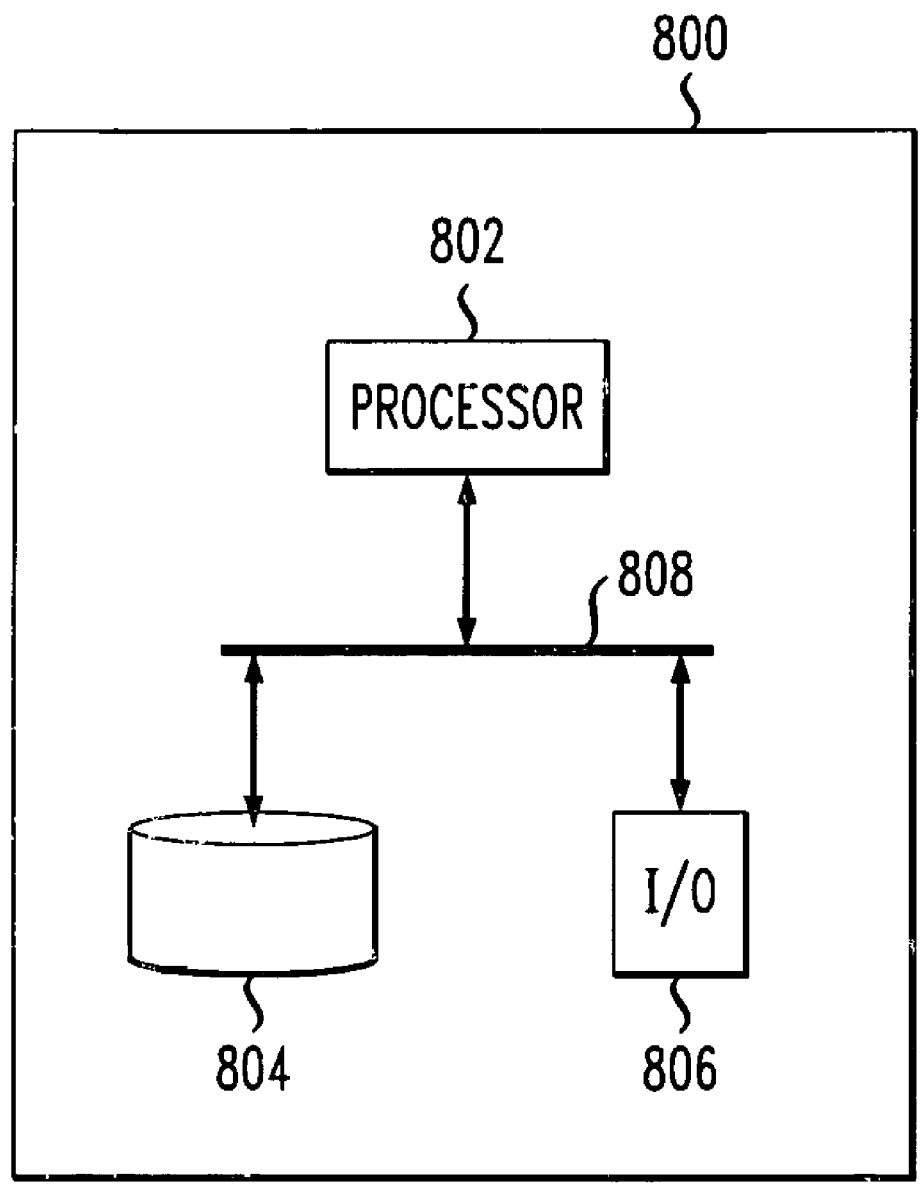
FIG. 8 is a block diagram of an illustrative processing device which may be used for implementing one or more components of the invention.

FIG. 8 depicts an illustrative processing device 800 in which one or more components of the wireless networking system, including the server, the access point, or the station, may be implemented, in accordance with the invention. In this illustrative implementation, a processor 802 for implementing at least a portion of the methodologies of the invention is operatively coupled to a memory 804 and an I/O interface 806 via a bus 808, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc. Furthermore, the term "I/O" as used herein is intended to include, for example, one or more input and/or output devices (e.g., keyboard) and/or one or more input and/or output ports (e.g., RS-232, infrared, radio frequency (RF), etc.) for transferring data between the processor and another system component.

It is to be appreciated that while the present invention has been described herein in the context of a network communication system, at least a portion of the methodologies of the present invention may be capable of being distributed in the form of computer readable media, and that the present invention applies equally regardless of the particular type of signal-bearing media actually used to carry out the distribution. The term "computer readable media" as used herein is intended to include recordable-type media, such as, for example, a floppy disk, a hard disk drive, RAM, compact disk (CD) ROM, etc., and transmission-type media, such as digital and analog communication links, wired or wireless communication links using transmission forms, such as, for example, RF and optical transmissions, etc. The computer readable media may take the form of coded formats that are decoded for use in a particular data processing system.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 802. In any case, it is to be appreciated that at least some of the components of the invention, described herein and shown in the appended figures, maybe implemented in various forms of hardware, software, or combinations thereof, e.g., one or more operatively programmed general purpose digital computers with associated memory, implementation-specific integrated circuit(s), functional circuitry, etc. Given the teachings of the invention provided herein, one of ordinary skill in the art will be able to contemplate other implementations of the components of the invention.

As previously discussed herein, the access control methodology of the present invention advantageously allows a network manager to maintain full control on the accessability of the wireless network by the user. The access control methodology illustratively provides such access control at the access point level. Access control privileges may be distinguished according to user type, or alternative criteria, by assigning a profile corresponding to each user in the network. The profile is preferably decrypted by trusted access points and the server, such that invalid access points and/or profiles will not function properly in a network employing the access control scheme. Preferably, the access control methodology of the present invention may be employed with essentially any WLAN system. Furthermore, the present invention contemplates that the access control protocol may be extended to other wireless systems, such as, but not limited to, wireless cellular systems, or hybrid systems capable of supporting multiple wireless standards (e.g., 802.11, 3G Wireless, etc.).

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims. For example, the invention can be used with standards other than IEEE 802.11 (e.g., IEEE 802.15), as well as in non-standard applications.

What is claimed is:

1. In a wireless system comprising a server and at least one access point operatively coupled to the server, a method for controlling access to the at least one access point, the method comprising the steps of:
    assigning a profile to a station adapted for communication with the wireless system, the profile corresponding to at least one user type and representing at least an access characteristic of the station; and
    associating the station to the at least one access point based at least in part on the profile assigned to the station;
    whereby access to the at least one access point by the station is selectively controlled by the at least one access point such that the at least one station is given selective access to the at least one access point based at least in part on the profile assigned to the at least one station;
    wherein at least a portion of the profile is encrypted using a key shared by the server and the at least one access point but not the station; and
    wherein the method further comprises the step of setting an expiration of the profile, the step of setting the expiration of the profile comprising:
    assigning a timeout period to the profile, the timeout period corresponding to an interval of time in which the profile is valid;
    assigning a timestamp to the profile, the timestamp indicating a start of the timeout period; and
    storing the timeout period and the timestamp within the profile, at least one of the timeout period and the timestamp being stored in both an encrypted format and an unencrypted format.

2. The method of claim 1, wherein the step of assigning the profile to the station comprises relating an identification characteristic of a user associated with the station to the profile.

3. The method of claim 2, wherein the identification characteristic comprises a user name and a password corresponding to the user name.

4. The method of claim 1, wherein the step of assigning the profile to the station comprises authenticating a user associated with the station.

5. The method of claim 4, wherein the step of authenticating the user comprises at least one of:
    the server sending an acknowledgment to the at least one access point associated with the station when the user is a valid user; and
    the server sending a negative acknowledgment to at least one of the station and the at least one access point associated with the station when the user is not a valid user.

6. The method of claim 1, wherein the step of assigning the profile to the station comprises the steps of:
    in the server, encrypting the profile; and
    sending the encrypted profile to at least one of the station and one or more access points associated with the station.

7. The method of claim 1, wherein the step of associating the station with the at least one access point comprises the steps of:
    the station sending an association request and the profile assigned to the station to the at least one access point;
    the at least one access point verifying a validity of the profile; and
    the at least one access point storing the profile when the profile is a valid profile.

8. The method of claim 7, wherein the step of associating the station with the at least one access point further comprises at least one of:
    the at least one access point sending an acknowledgment to the station when the profile is a valid profile; and
    the at least one access point sending a negative acknowledgment to the station when the profile is not a valid profile.

9. The method of claim 7, further comprising the step of removing the profile of the station from at least one associated access point when the station is no longer associated with the at least one access point.

10. The method of claim 1, further comprising the steps of:
    assigning a priority level to each of a plurality of profiles corresponding to a plurality of users communicating through a same access point; and
    the access point selecting one of the plurality of users based at least in part on the priority levels of the plurality of profiles.

11. The method of claim 1, further comprising the step of changing the profile assigned to the station.

12. The method of claim 11, wherein the step of changing the profile of the station comprises:
    the server sending a new profile to at least one access point associated with the station;
    the at least one access point replacing a previous profile with the new profile;
    the at least one access point verifying that the station is associated with the at least one access point;
    when the station is associated with the at least one access point, sending the new profile to the associated station; and
    the station replacing a previous profile with the new profile.

13. A wireless system comprising:
    a server;
    at least one access point couplable to the server; and
    at least one station adapted for communication with the at least one access point, the at least one station including a profile assigned thereto, the profile corresponding to at least one user type and representing at least an access characteristic of the at least one station, the at least one station being associated to the at least one access point based at least in part on the profile assigned to the at least one station;
    whereby access to the at least one access point by the at least one station is selectively controllable by the at least one access point such that the at least one station is given selective access to the at least one access point based at least in part on the profile assigned to the at least one station; and
    wherein at least a portion of the profile is encrypted using a key shared by the server and the at least one access point but not the at least one station; and
    wherein the profile has a timeout period and a timestamp assigned thereto, the timeout period corresponding to an interval of time in which the profile is valid and the timestamp indicating a start of the timeout period, the timeout period and the timestamp being stored within the profile, at least one the timeout period and the timestamp being stored in both an encrypted format and an unencrypted format.

14. A server for use in a wireless communication system, the wireless communication system comprising at least one access point operatively coupled to the server and at least one station adapted for communication with the at least one access point, the server comprising:

memory; and at least one processor coupled to the memory, the at least one processor being operative to: assign a profile to the at least one station, the profile corresponding to at least one user type and representing at least an access characteristic of the at least one station; storing the profile in the memory; and associate the at least one station to the at least one access point, based at least in part on the profile assigned to the at least one station; whereby access to the at least one access point by the at least one station is selectively controlled by the at least one access point such that the at least one station is given selective access to the at least one access point based at least in part on the profile assigned to the at least one station; wherein at least a portion of the profile is encrypted using a key shared by the server and the at least one access point but not the at least one station; and wherein the at least one processor is further operative to set an expiration of the profile, the operation of setting the expiration of the profile comprising: assigning a timeout period to the profile, the timeout period corresponding to an interval of time in which the profile is valid; assigning a timestamp to the profile, the timestamp indicating a start of the timeout period; and storing the timeout period and the timestamp within the profile, at least one of the timeout period and the timestamp being stored in both an encrypted format and an unencrypted format.

15. The server of claim 14, wherein the at least one processor is further operative to authenticate a user associated with the station.

16. The server of claim 15, wherein the step of authenticating the user comprises at least one of:

sending an acknowledgment to the at least one access point associated with the at least one station when the user is a valid user; and sending a negative acknowledgment to at least one of the at least one station and the at least one access point associated with the at least one station when the user is not a valid user.

17. The server of claim 14 wherein the at least one processor is further operative to: encrypt the profile; and send the encrypted profile to at least one of the at least one station and the at least one access point associated with the at least one station.

18. The server of claim 14 wherein the at least one processor is further operative to set an expiration of the profile.

19. The server of claim 18, wherein the step of setting the expiration of the profile comprises:

assigning a timeout period to the profile, the timeout period corresponding to an interval of time in which the profile is valid;

assigning a timestamp to the profile, the timestamp indicating a start of the timeout period; and storing the timeout period and the timestamp within the profile.

20. An access point for use in a wireless system comprising a server couplable to the access point and at least one station configurable for communication with the access point, the access point comprising:

memory; and at least one processor coupled to the memory, the at least one processor being operative to: (i) receive a profile from the server, the profile corresponding to at least one user type and representing at least an access characteristic of the at least one station; (ii) assign the profile to the at least one station; and (iii) associate the at least one station to the access point based at least in part on the profile assigned to the at least one station; whereby access to the access point by the at least one station is selectively controlled by the access point such that the at least one station is given selective access to the at least one access point based at least in part on the profile assigned to the at least one station; wherein at least a portion of the profile is encrypted using a key shared by the server and the at least one access point but not the at least one station; and wherein an assigned timeout period and an assigned timestamp are stored within the profile, at least one of the timeout period and the timestamp being stored in both an encrypted format and an unencrypted format, the timeout period corresponding to an interval of time in which the profile is valid and the timestamp indicating a start of the timeout period.

21. The access point of claim 20, wherein the step of associating the at least one station with the access point comprises:

receiving, from the at least one station, an association request and the profile assigned to the station;

verifying a validity of the profile; and storing the profile in the memory when the profile is a valid profile.

22. The access point of claim 21, wherein the at least one processor is further operative to perform at least one of: (i) sending an acknowledgment to the at least one station when the profile is a valid profile, and (ii) sending a negative acknowledgment to the at least one station when the profile is not valid.

23. The access point of claim 20, wherein the at least one processor is further operative to encrypt the profile received from the server and send the encrypted profile to the at least one station.

24. The access point of claim 20, wherein the at least one processor is further operative to remove the profile of the at least one station from the memory when the at least one station is no longer associated with the access point.

25. The access point of claim 20, wherein the at least one processor is further operative to: (i) assign a priority level to each of a plurality of profiles corresponding to a plurality of users communicating through the access point; and (ii) select one of the plurality of users based at least in part on the priority levels of the plurality of profiles.

26. The access point of claim 20, wherein the at least one processor is further operative to change the profile assigned to the at least one station.

27. The access point of claim 26, wherein the step of changing the profile assigned to the at least one station comprises:

receiving a new profile from the server;

replacing a previous profile stored in the memory with the new profile;

verifying that the at least one station is associated with the access point; and when the at least one station is associated with the access point, sending the new profile to the associated at least one station.

28. A station configurable for communication with at least one access point in a wireless system, the station comprising:
   memory; and
   at least one processor coupled to the memory, the at least one processor being operative to: (i) receive a profile from the at least one access point, the profile corresponding to at least one user type and representing at least an access characteristic of the station; (ii) assign the profile to the station; and (iii) associate the station to the at least one access point based at least in part on the profile assigned to the station; whereby access to the at least one access point by the station is selectively controlled by the at least one access point such that the at least one station is given selective access to the at least one access point based at least in part on the profile assigned to the at least one station; wherein at least a portion of the profile is encrypted using a key shared by the server and the at least one access point but not the station; and
wherein the profile has a timeout period and a timestamp assigned thereto, the timeout period corresponding to an interval of time in which the profile is valid and the timestamp indicating a start of the timeout period, the timeout period and the timestamp being stored within the profile, at least one of the timeout period and the timestamp being stored in both an encrypted format and an unencrypted format.

* * * * *